(12) United States Patent
Axline

(10) Patent No.: US 11,673,505 B2
(45) Date of Patent: Jun. 13, 2023

(54) CARGO RESTRAINT ASSEMBLY

(71) Applicant: GOODRICH CORPORATION, Charlotte, NC (US)

(72) Inventor: Nicholas T. Axline, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 517 days.

(21) Appl. No.: 16/809,966

(22) Filed: Mar. 5, 2020

(65) Prior Publication Data

US 2021/0276478 A1    Sep. 9, 2021

(51) Int. Cl.
*B60P 7/08* (2006.01)
*B64D 9/00* (2006.01)
*B60P 7/13* (2006.01)

(52) U.S. Cl.
CPC .............. *B60P 7/0807* (2013.01); *B60P 7/13* (2013.01); *B64D 9/003* (2013.01)

(58) Field of Classification Search
CPC .. B60P 7/0807; B60P 7/13; B60P 7/08; B64D 9/003; B64D 9/00
USPC ................ 410/69, 79, 77, 92, 82, 99, 90, 86
See application file for complete search history.

(56) References Cited

U.S. PATENT DOCUMENTS

| | | | |
|---|---|---|---|
| 3,778,012 A | 12/1973 | Fernandez | |
| 4,457,649 A | 7/1984 | Vogg et al. | |
| 4,929,133 A | 5/1990 | Wiseman | |
| 5,011,348 A | 4/1991 | Jensen et al. | |
| 5,316,242 A * | 5/1994 | Eilenstein-Wiegmann | B64D 9/003 244/137.1 |
| 5,564,654 A | 10/1996 | Nordstrom | |
| 5,871,317 A | 2/1999 | Huber et al. | |
| 6,270,300 B1 | 8/2001 | Huber et al. | |
| 6,450,744 B1 * | 9/2002 | Gilhuys | B64D 9/003 410/80 |
| 6,488,457 B2 * | 12/2002 | Diamante | B64D 11/0696 410/84 |
| 7,731,460 B2 | 6/2010 | Brown et al. | |
| 8,221,038 B1 * | 7/2012 | Moradians | B64D 9/003 410/69 |
| 8,690,103 B2 | 4/2014 | Schulze et al. | |
| 9,079,665 B2 | 7/2015 | Larson et al. | |
| 10,556,683 B2 * | 2/2020 | Bogar | B60P 7/0892 |
| 2019/0248269 A1 | 8/2019 | Shivalinga et al. | |

OTHER PUBLICATIONS

European Patent Office, European Search Report dated Jun. 28, 2021 in Application No. 21160417.8.

* cited by examiner

Primary Examiner — D Glenn Dayoan
Assistant Examiner — Sunsurraye Westbrook
(74) Attorney, Agent, or Firm — Snell & Wilmer L.L.P.

(57) ABSTRACT

A cargo restraint assembly may comprise a first bracket slidingly coupled to a housing. A retention block may be pivotably coupled to the first bracket. A second bracket may be slidingly coupled to the housing. The first bracket may be coupled to the second bracket via a spring. The first bracket and the second bracket may be configured to attenuate in response to a cargo deck bending during transportation of cargo in an aircraft.

18 Claims, 6 Drawing Sheets

CARGO RESTRAINT ASSEMBLY

FIELD

The present disclosure relates generally to cargo handling systems, and more specifically, to a cargo restraint assembly, which can be mounted to along a centerline of adjacent cargo systems.

BACKGROUND

Cargo handling systems, such as those used by aircraft for transport of containerized cargo or pallets, also referred to as unit load devices (ULDs), typically include longitudinal trays containing transport rollers positioned along a cargo deck floor to facilitate movement of the ULDs relative to the deck floor. The cargo handling systems may include cargo guides configured to provide longitudinal guidance and/or lateral restraint of ULDs through the cargo deck. The cargo handling systems may include cargo restraints configured to restrain ULDs in various combinations of the longitudinal, lateral, and vertical directions during transport.

SUMMARY

A cargo restraint assembly is disclosed herein. The cargo restraint assembly may comprise: a housing having a first end wall, a second end wall, a first base, and a second base, the first end wall extending from the first base to the second base, the second end wall extending from the first base to the second base, the first end wall disposed opposite the second end wall; a first bracket disposed between the first end wall and the second end wall, the first bracket slidably coupled to the first end wall and the second end wall; and a first guide block pivotably coupled to the first bracket.

In various embodiments, the cargo restraint assembly may further comprise a second bracket disposed between the first end wall and the second end wall, the second bracket slidably coupled to the first end wall and the second end wall. The cargo restraint assembly may further comprise a second guide block pivotably coupled to the second bracket. The cargo restraint assembly may further comprise a spring disposed between the first bracket and the second bracket. The first bracket and the second bracket may each comprise an H-shape. The cargo restraint assembly may further comprise a first shaft and a first pin, wherein the first bracket comprises a first flange and a second flange, wherein the first flange is disposed adjacent to the first end wall, wherein the second flange is disposed adjacent to the second end wall, wherein the first shaft extends from a first slot in the first end wall through the first flange through the second flange and through a second slot in the second end wall, and wherein the first pin extends from a third slot in the first end wall through the first flange. The first guide block may comprise a lateral retention portion, a vertical retention portion, a first wing portion and a second wing portion, the lateral retention portion extending from the first flange to the second flange, the vertical retention portion extending from the lateral retention portion in a lateral direction, the first wing portion extending in a longitudinal direction away from the lateral retention portion past the first end wall, and the second wing portion extending in a negative longitudinal direction away from the lateral retention portion past the second end wall. The cargo restraint assembly may further comprise a first shaft extending from a first flange of the first bracket to a second flange of the first bracket, wherein the first guide block is configured to rotate about the first shaft. The cargo restraint assembly may further comprise a torsion spring coupled to the first shaft and the first guide block.

A cargo loading system is disclosed herein. The cargo loading system may comprise: a cargo deck; a first tray extending longitudinally along the cargo deck; a second tray disposed laterally adjacent to the first tray, the second tray extending longitudinally along the cargo deck; a cargo restraint assembly disposed between the first tray and the second tray, the cargo restraint assembly coupled to the cargo deck, the cargo restraint assembly comprising: a housing; a first bracket slidingly coupled to the housing; a second bracket slidingly coupled to the housing; a spring extending between the first bracket and the second bracket; a first guide block pivotably coupled to the first bracket; and a second guide block pivotably coupled to the second bracket.

In various embodiments, the housing may comprise a first end wall, a second end wall, a first base, and a second base, the first end wall extending from the first base to the second base, the second end wall extending from the first base to the second base, the first end wall disposed opposite the second end wall, wherein the first base and the second base are coupled to the cargo deck. The first end wall and the second end wall may comprise a plurality of slots, and the first bracket and the second bracket may be slidingly coupled to the plurality of slots. The cargo restraint assembly may further comprise a first shaft, a first pin, and a second pin, wherein the first bracket and the second bracket each comprise a first flange and a second flange, wherein the first flange is disposed adjacent to the first end wall, wherein the second flange disposed adjacent to the second end wall, wherein the first shaft extends from a first slot in the plurality of slots through the first flange and through the second flange into a first slot in the plurality of slots in the second end wall, wherein a first pin extends from a second slot in the first end wall through the first flange, and a second pin extends from the second flange through a second slot in the plurality of slots in the second end wall. The first guide block and the second guide block may each comprise a lateral retention portion, a vertical retention portion, a first wing portion and a second wing portion, the lateral retention portion extending from the first flange to the second flange, the vertical retention portion extending from the lateral retention portion in a lateral direction, the first wing portion extending in a longitudinal direction away from the lateral retention portion past the first end wall, and the second wing portion extending in a negative longitudinal direction away from the lateral retention portion past the second end wall. The first bracket, the second bracket, the first guide block and the second guide block may be configured to attenuate in response to the cargo deck bending. The first bracket and the second bracket may each comprise an H-shape. The cargo loading system may further comprising a first shaft extending from a first flange of the first bracket to a second flange of the second bracket, wherein the first guide block is configured to rotate about the first shaft. The cargo loading system may further comprising a torsion spring coupled to the first shaft and the first guide block.

A method of attenuating a cargo retention assembly is disclosed herein. The method may comprise: translating a first guide block and a second guide block in a lateral direction away from each other via a spring in response to a cargo deck bending; and translating the first guide block and the second guide block towards each other in response to the cargo deck no longer bending.

In various embodiments, the first guide block and the second guide block may be slidingly coupled to a housing via a first bracket and a second bracket, wherein the spring is disposed between the first bracket and the second bracket.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION OF THE DRAWINGS

Figure 1:
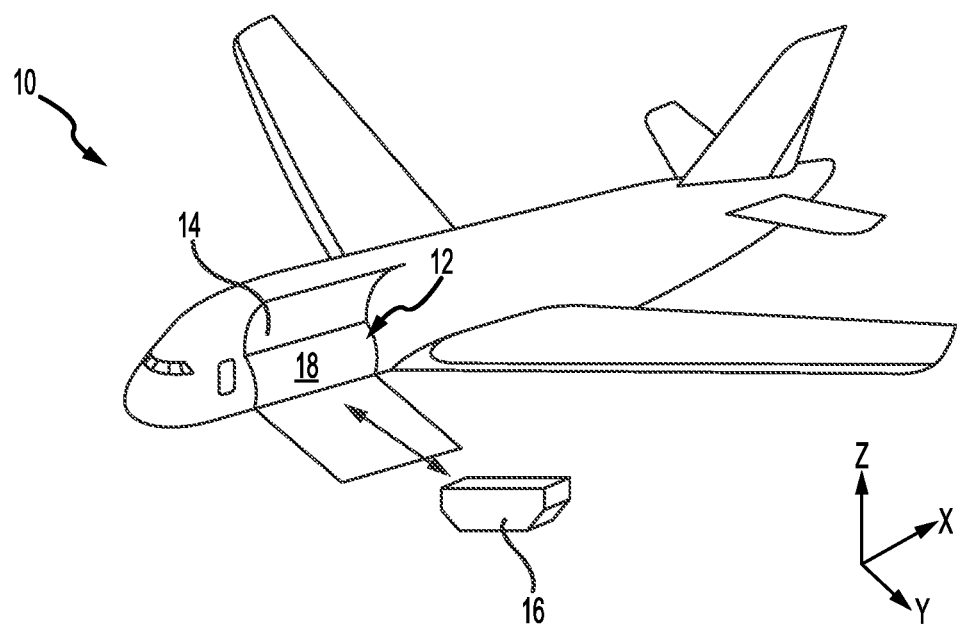
FIG. 1 illustrates an axonometric view of an aircraft being loaded with cargo, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures but may not necessarily be repeated herein for the sake of clarity.

As used herein, "aft" refers to the direction associated with the tail (i.e., the back end) of an aircraft, or generally, to the direction of exhaust of a gas turbine engine. As used herein, "forward" refers to the direction associated with the nose (i.e., the front end) of an aircraft, or generally, to the direction of flight or motion.

Cargo handling systems, as disclosed herein, may comprise cargo restraint assemblies configured to guide and restrain the movement of ULDs or other cargo across the floor or "cargo deck" of an aircraft. In accordance with various embodiments, the cargo restraint assemblies may be coupled to a cargo deck and disposed between a first row of a cargo system and a second row of a cargo system. In this regard, the cargo restraint assembly may restrain a first cargo in the first row and a second cargo in the second row in the vertical and lateral directions. The cargo restraint assembly may comprise a first guide block and a second guide block. The first guide block may comprise a width greater than a gap between tabs of a respective cargo edge/lip. Similarly, the second guide block may comprise a width greater than a gap between tabs of a respective cargo edge/lip. In this regard, the first guide block and the second guide block may restrain a first cargo and a second cargo vertically and laterally regardless of where the tabs of the respective cargo aligns longitudinally. The cargo restraint assembly may be configured for attenuation during transport of the first cargo and second cargo. For example, a cargo deck may bend during operation of an aircraft and the first guide block and the second guide block may extend away from each other in response and maintain contact with the tabs of the corresponding cargo.

With reference to FIG. 1, an aircraft 10 is illustrated. Aircraft 10 includes a cargo compartment 12. A cargo door 14 provides access to cargo compartment 12 from outside aircraft 10. Cargo 16 (e.g., pallets or ULDs) may be loaded and unloaded through cargo door 14 and onto a cargo deck 18 of aircraft 10.

Figure 2:
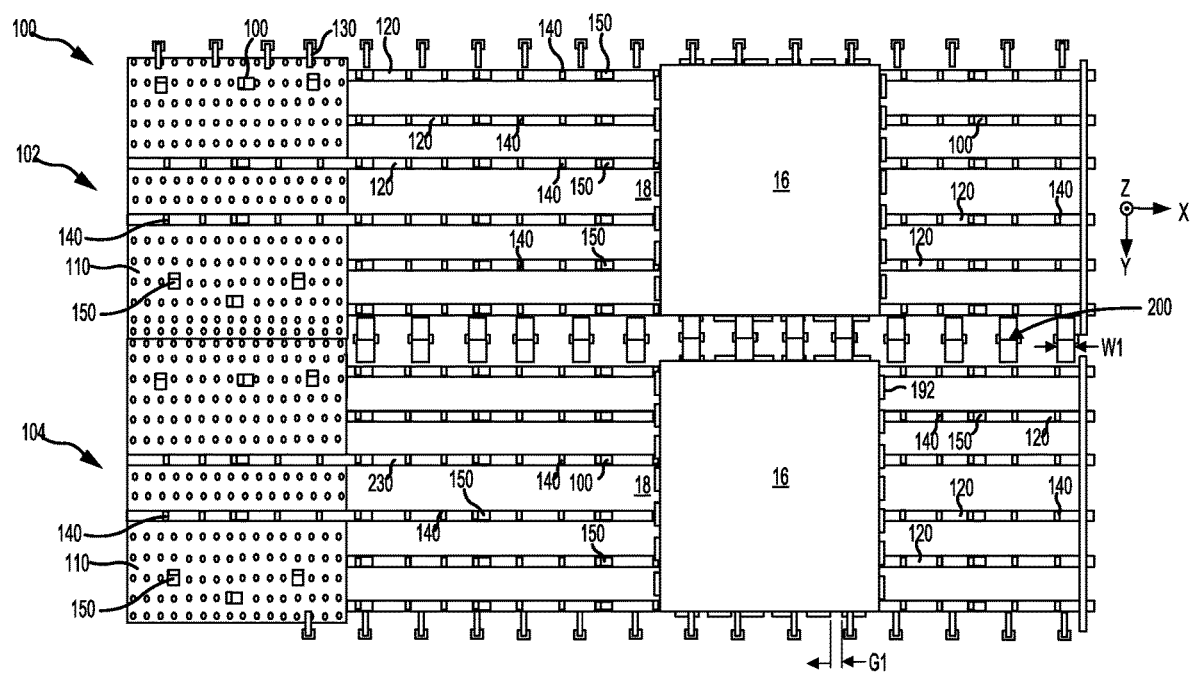
FIG. 2 illustrates a top down view of a ULD located on a cargo handling system, in accordance with various embodiments.

Referring now to FIG. 2, a cargo handling system 100, in accordance with various embodiments, is illustrated. Cargo handling system 100 may be used to load, move, and unload cargo 16 from cargo deck 18. Cargo handling system 100 includes components configured to facilitate translation of cargo 16 along cargo deck 18. For example, cargo handling system 100 may include ball mats (or caster panels) 110, roller trays (or caster trays) 120, and edge restraint/guide assemblies 130. In various embodiments, ball mats 110 may be located proximate cargo door 14, with momentary reference to FIG. 1. Roller trays 120, which each include one or more rollers 140, may be oriented in a longitudinal direction. As used herein, the term "longitudinal" refers to forward and aft directions (i.e., a direction parallel to the x-axis on the provided xyz axes). In this regard, roller trays 120 may facilitate forward and aft translation of cargo 16. Cargo handling system 100 may further include one or more power drive units (PDUs) 150 configured to propel cargo 16 in a desired direction. PDUs 150 may be located in ball mats 110, roller trays 120, and/or in any other desired location along cargo deck 18. Edge restraint/guide assemblies 130 may be located along the edges of cargo deck 18. Edge restraint/guide assemblies 130 may restrict lateral and vertical translation of cargo 16. As used herein, the term "lateral" refers to directions perpendicular to the longitudinal direction (i.e., directions parallel to the y-axis on the provided xyz axes). As used herein, the term "vertical" refers to directions perpendicular to cargo deck 18 (i.e., direction perpendicular to the xy-plane and/or parallel to the z-axis on the provided xyz axes). In various embodiments, the cargo handling system 100 may include a first cargo row 102 and a second cargo row 104. The first cargo row 102 may be disposed laterally adjacent to the second cargo row 104.

Cargo handling system 100 may include a cargo restraint assembly 200. The cargo restraint assembly 200 may be disposed between the first cargo row 102 and the second cargo row 104. In various embodiments, cargo restraint assembly 200 may be mounted to the cargo deck 18, a roller tray 120, or the like. In various embodiments, the cargo 16 may comprise a plurality of tabs 192 disposed around a perimeter of cargo 16. In various embodiments, a width W1 of the cargo restraint assembly 200 may be greater than a gap G1 between adjacent tabs in the plurality of tabs 192 from cargo 16. In this regard, if a cargo restraint assembly 200 ends up between two adjacent tabs in the plurality of tabs 192, the cargo restraint assembly 200 may maintain restriction of vertical and lateral movement of the cargo 16 during transport. To handle larger cargo, the cargo restraint assembly 200 may be positioned in stowed position. In the stowed position, a corresponding cargo may translate over roller trays 120 without contacting the cargo restraint assembly 200.

Figure 3:
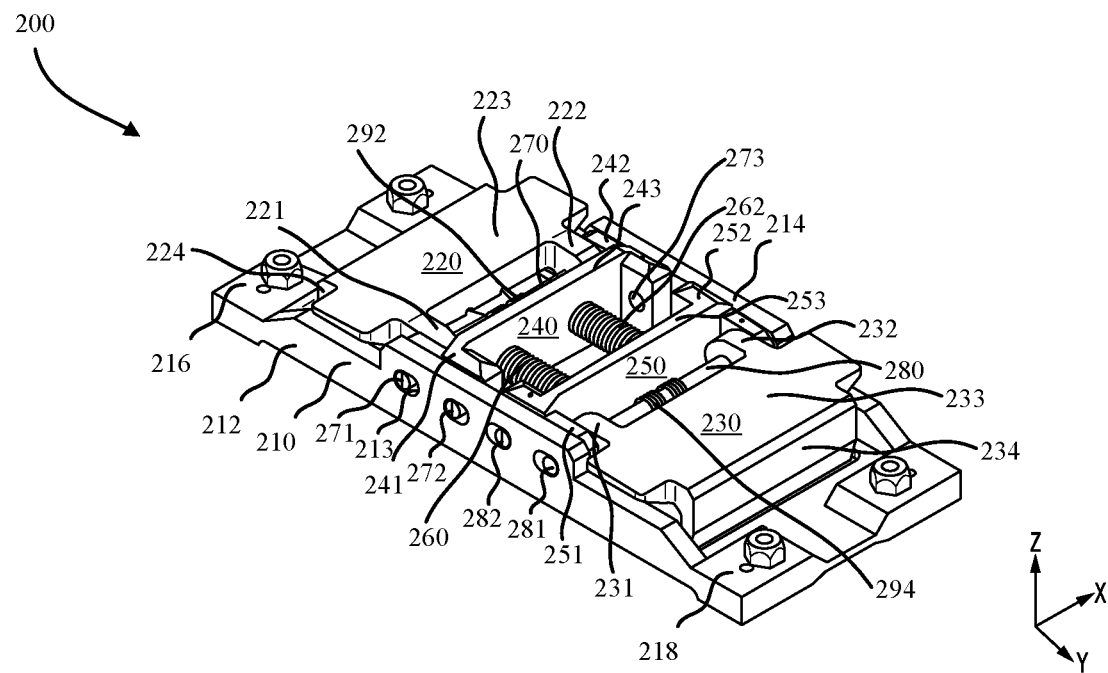
FIG. 3 illustrates a perspective view of a cargo restraint assembly in a stored position, in accordance with various embodiments.

Referring now to FIG. 3, a cargo restraint assembly 200, in accordance with various embodiments, is illustrated. In various embodiments, the cargo restraint assembly 200 comprises a housing 210, a first guide block 220, a second guide block 230, a first bracket 240, a second bracket 250, and a first spring 260. The housing 210 comprises a first end wall 212 and a second end wall 214. The first end wall 212 extends from a first base 216 to a second base 218. Similarly, the second end wall 214 extends from the first base 216 to the second base 218. The first base 216 and the second base 218 may be configured to be coupled to a cargo deck 18 as shown in FIG. 2 by any method known in the art, such as bolt and nuts, or the like. The first end wall 212 may comprise a plurality of slots 213. Each slot in the plurality of slots 213 may be configured to receive a shaft (e.g., a first shaft 270 and/or a second shaft 280).

In various embodiments, the first bracket 240 and the second bracket 250 may be disposed between first end wall 212 and second end wall 214. Each bracket may comprise a first flange, a second flange, and a wall extending from the first flange to the second flange. For example, the first bracket 240 may comprise a first flange 241, a second flange 242, and a wall 243 extending between the first flange 241 and the second flange 242. The first flange 241 may be disposed adjacent to the first end wall 212 of the housing 210. The second flange 242 may be disposed adjacent to the second end wall 214 of the housing 210. The first flange 241 and the second flange 242 may be slidably coupled to the first end wall 212 and the second end wall 214 of the housing 210. For example, a first end 271 of the first shaft 270 and a first pin 272 may engage respective slots in the plurality of slots 213 in the first end wall 212 of the housing 210. On the opposite side, a second end (not visible) of the first shaft 270 and a second pin 273 may engage respective slots in the plurality of slots 213 in the second end wall 214 of the housing 210. Similarly, the second bracket 250 may comprise a first flange 251, a second flange 252, and a wall 253 extending between the first flange 251 and the second flange 252. The first flange 251 may be disposed adjacent to the first end wall 212 of the housing 210. The second flange 252 may be disposed adjacent to the second end wall 214 of the housing 210. The first flange 251 and the second flange 252 may be slidably coupled to the first end wall 212 and the second end wall 214 of the housing 210. For example, a first end 281 of the first shaft 280 and a first pin 282 may engage a respective slot in the plurality of slots 213 in the first end wall 212 of the housing 210. On the opposite side, a second end (not visible) of the first shaft 270 and a second pin (not visible) may engage respective slots in the plurality of slots 213 in the second end wall 214 of the housing 210.

In various embodiments, the first guide block 220 may comprise a lateral retention portion 223, a vertical retention portion 224, a first flange 221, and a second flange 222. Similarly, the second guide block 230 may comprise a lateral retention portion 233, a vertical retention portion 234, a first flange 231, and a second flange 232. The first guide block 220 may be pivotably coupled to the first bracket 240, and the second guide block 230 may be pivotably coupled to the second bracket 250. For example, the first flange 221 of the first guide block 220 may be coupled to the first flange 241 of the first bracket 240 via the shaft 270 that extends through the respective holes in each, and the second flange 222 of the first guide block 220 may be coupled to the second flange 242 of the first bracket 240 via the shaft 270 that extends through respective holes in each. Similarly, the first flange 231 of the second guide block 230 may be coupled to the first flange 251 of the second bracket 250 via the shaft 280 that extends through respective holes in each, and the second flange 232 of the second guide block 230 may be coupled to the second flange 252 of the second bracket 250 via the shaft 280 that extends through respective holes in each.

In various embodiments, the cargo restraint assembly 200 may further comprise a first shaft 270 and a second shaft 280. The first shaft 270 may slidingly couple the first bracket 240 and the first guide block 220 to the housing 210. For example, the first shaft 270 may extend through a respective slot in the plurality of slots 213 on the first end wall 212 through the first flange 241 of the first bracket 240 through the first flange 221 of the first guide block 220 through the second flange 222 of the first guide block 220 through the second flange 242 of the first bracket 240 to the a respective slot in the plurality of slots 213 on the second end wall 214. Similarly, the second shaft 280 may extend from a respective slot in the plurality of slots 213 on the first end wall 212 through the first flange 251 of the second bracket 250 through the first flange 231 of the second guide block 230 through the second flange 232 of the second guide block 230 through the second flange 252 of the second bracket 250 to a respective slot in the plurality of slots 213 on the second end wall 214.

In various embodiments, the cargo restraint assembly 200 may further comprise a first torsional spring 292 and a second torsional spring 294. The first torsional spring 292 may be operably coupled to the first guide block 220 and the second torsional spring 294 may be operably coupled to the second guide block 230. For example, the first torsional spring 292 may be coupled to the first shaft 270 and have its functional ends in contact with the first guide block 220 and first bracket 240, and the second torsional spring 294 may be coupled to the second shaft 280 and have its functional ends in contact with the second guide block 230 and the second bracket 250. In this regard, the first torsional spring 292 may bias the first guide block 220 in a vertical direction to an extracted state by torsionally pushing off of the first bracket 240, and the second torsional spring 294 may bias the second guide block 230 in a vertical direction to an extracted state by torsionally pushing off of the second bracket 250. As such, the cargo restraint assembly 200 may further comprise retaining mechanisms to retain the first guide block 220 and the second guide block 230 in a stowed position, such as a releasable tab, or the like. Thus, a default position for the cargo restraint assembly 200 may be an extracted state, as described further herein.

In various embodiments, the first spring 260 may be disposed between, and coupled to, the wall 243 of the first bracket 240 and the wall 253 of the second bracket 250. The first spring 260 may be configured to allow the first bracket 240, the second bracket 250, the first guide block 220, and the second guide block 230 to attenuate in the housing 210, via the plurality of slots 213, during transportation of cargo 16 from FIG. 2. For example, when an aircraft (e.g., aircraft 10 from FIG. 1), flexes in an area of the wings within the cargo deck 18 from FIG. 2, the cargo deck 18 may stretch, so the cargo restraint assembly 200 may attenuate and allow the first guide block 220 and the second guide block 230 to translate away from each other and/or maintain vertical contact with the tabs 192 from FIG. 2 during the condition. In various embodiments, the cargo restraint assembly 200 may further comprise a second spring 262 disposed between, and coupled to, the wall 243 of the first bracket 240 and the wall 253 of the second bracket 250. In various embodiments, the second spring 262 may provide additional attenuation support for the cargo restraint assembly 200.

Figures 4A, 4B:
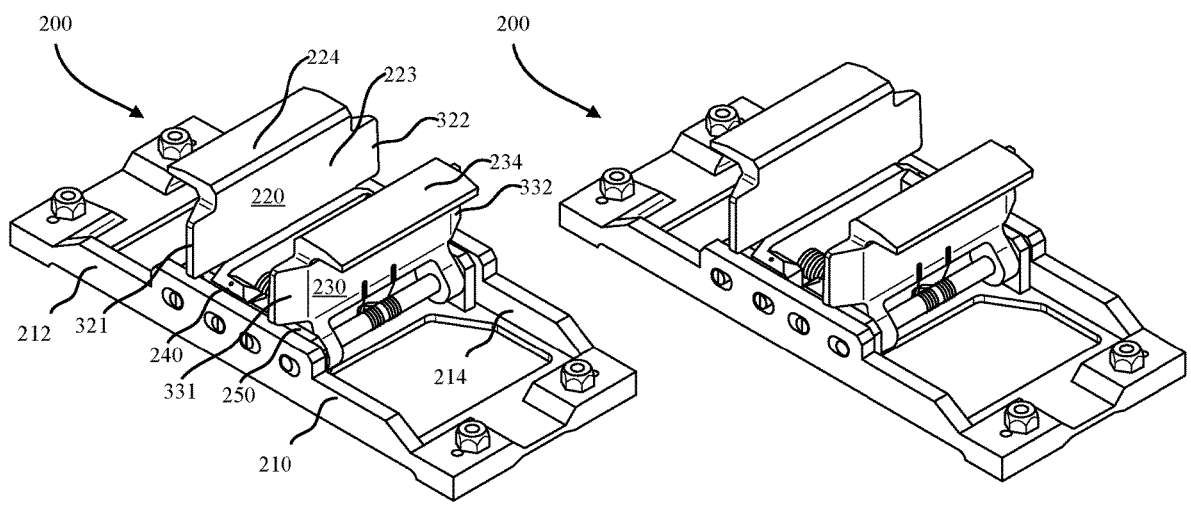
FIG. 4A illustrates a perspective view of a cargo restraint assembly in an erected position prior to attenuation, in accordance with various embodiments.
FIG. 4B illustrates a perspective view of a cargo restraint assembly in an erected position during attenuation, in accordance with various embodiments.

Referring now to FIG. 4A, a cargo restraint assembly 200 in a default state is illustrated, in accordance with various embodiments. A "default state," as disclosed herein, refers to a state where the first spring 260 and/or the second spring 262 from FIG. 3 are in a compressed state (e.g., the first spring 260 and/or the second spring 262 are experiencing compression). Referring now to FIG. 4B, a cargo restraint assembly 200 in an attenuated state is illustrated in accordance with various embodiments. An "attenuated state," as disclosed herein, refers to a state where the first spring 260 and/or the second spring 262 from FIG. 3 are extended from the default state but still in compression (e.g., first spring 260 and/or second spring 262 are in a lesser degree of compression). In this regard, during a wings down event, the first spring 260 and/or the second spring 262 may push the first bracket 240 and the second bracket 250 away from each other and into the attenuated state from FIG. 4B. When the aircraft returns to its normal state, the ULD pushes the first bracket 240 and second bracket 260 towards each other and compresses the first spring 260 and/or the second spring 262.

Referring now to FIG. 4A, the first guide block 220 and the second guide block 230 may each comprise a first wing portion and a second wing portion. For example, first guide block 220 may comprise first wing portion 321 and second wing portion 322. The first wing portion 321 may extend longitudinally from lateral retention portion 223 past first end wall 212 of housing 210. Similarly, the second wing portion 322 may extend longitudinally from lateral retention portion 223 past second end wall 214 of housing 210. In various embodiments, the first wing portion 321 and the second wing portion 322 may provide additional guidance during loading and unloading if a cargo 16 from FIG. 2 begins to skew laterally. Similarly, the second guide block 230 may comprise first wing portion 331 and second wing portion 332. The first wing portion 331 may extend longitudinally from lateral retention portion 233 past first end wall 212 of housing 210. Similarly, the second wing portion 332 may extend longitudinally from lateral retention portion 233 past second end wall 214 of housing 210.

In various embodiments, the vertical retention portion 224 of the first guide block 220 and the vertical retention portion 234 of the second guide block 230 may each comprise a lip. For example, the first guide block 220 and the second guide block 230 may each define a shoulder at the connection of the vertical retention portion (e.g., vertical retention portions 224, 234 and the lateral retention portions 223, 233).

Figure 5:
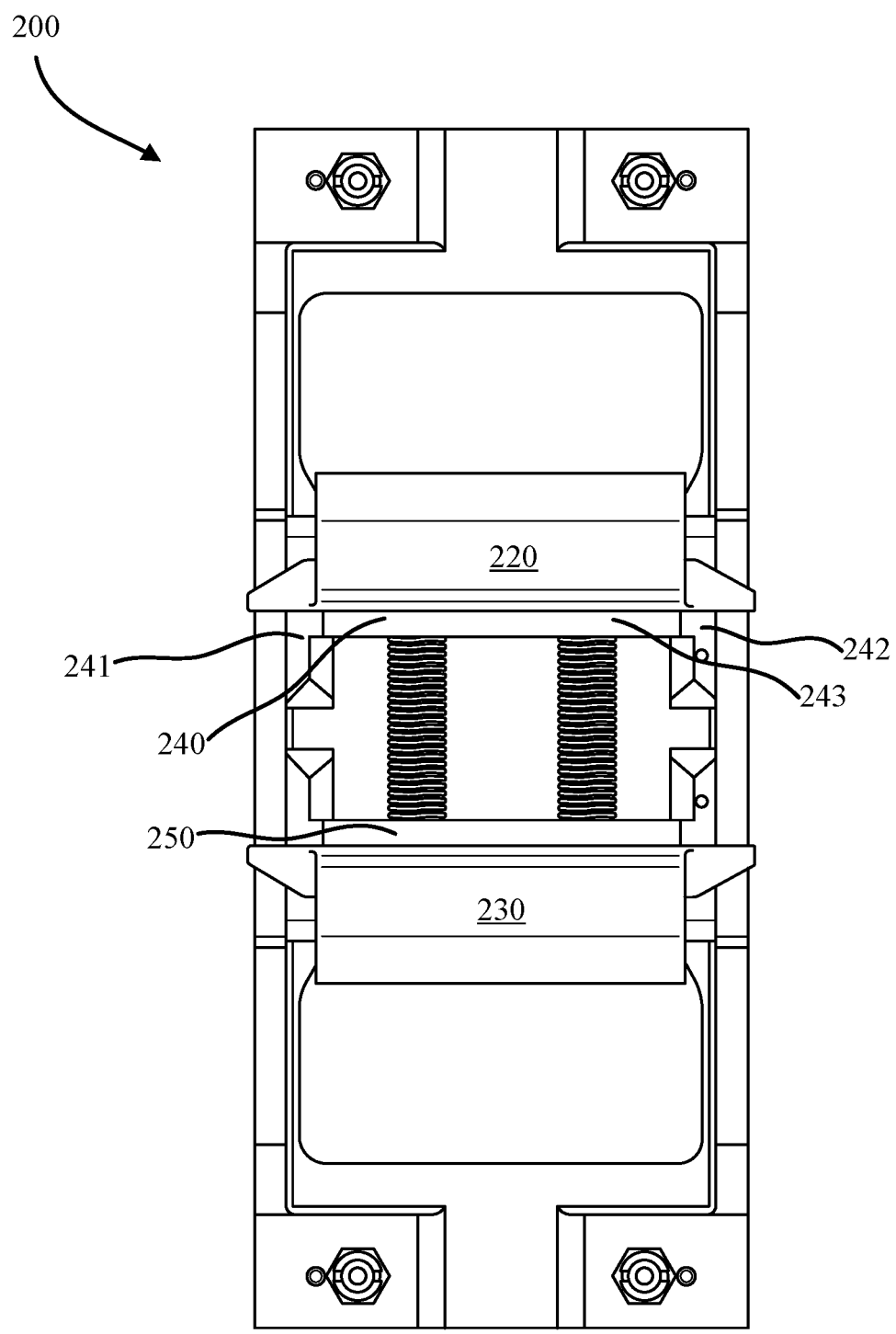
FIG. 5 illustrates a top view of a cargo restraint assembly in an erected position, in accordance with various embodiments.

Referring now to FIG. 5, a top view of a cargo restraint assembly 200, in accordance with various embodiments, is illustrated. In various embodiments, the first bracket 240 and the second bracket 250 may each define an H-shape from a top down view. For example, the first flange 241, the second flange 242, and the wall 243 of the first bracket 240 may define an H-shape from a top down view. The H-shape may maintain vertical alignment of the respective guide block. For example, with combined reference to FIGS. 3 and 5, the first bracket 240 may maintain a vertical alignment of the first guide block 220 during operation. In this regard, the H-shape may prevent the guide block from rotating due to the first shaft 270 and the first pin 272 that can resist torque about the X-axis while being allowed to move in the lateral direction along a respective slot in the plurality of slots 213 in the first end wall 212. Each slot in the plurality of slots 213 are where this torsional load is transferred. For example, in various embodiments, during operation of the cargo restraint assembly 200, the first pin 245 is pushed down onto the bottom of a respective slot in the plurality of slots 213 while the first shaft 270 is pulled up into the upper face of a respective slot in the plurality of slots 213. In various embodiments, the cargo restraint assembly 200 allows for a configuration to resist the torsional moment and maintain vertical alignment of the first guide block 220 and/or the second guide block 230.

Figure 6:
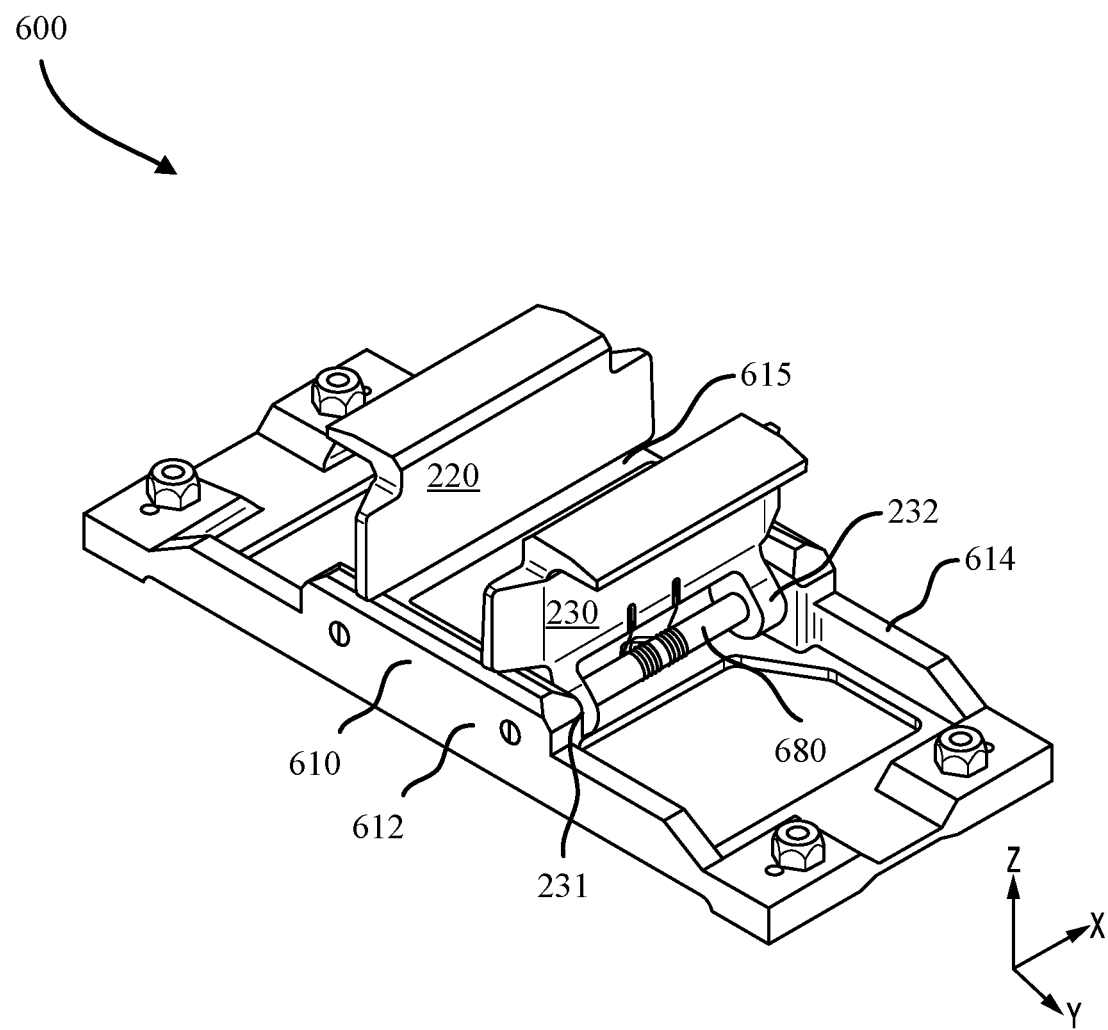
FIG. 6 illustrates a perspective view of a cargo restraint assembly in an erected position, in accordance with various embodiments.

Referring now to FIG. 6, a perspective view of a cargo restraint assembly 600, in accordance with various embodiments, is illustrated. The cargo restraint assembly 600 may be configured for non-attenuation. In this regard, the first bracket 240 and second bracket 250 may be replaced with a wall extending from first end wall 612 of the housing 610 to the second end wall 614 of the housing 610. For example, first wall 615 may extend from first end wall 612 of the housing 610 to the second end wall 614 of the housing. The first end wall 612 of the housing may be thickened to be disposed adjacent to the first guide block 220 similar to the first bracket 240 from FIGS. 3-5. In various embodiments, a respective shaft for each guide block may couple directly to side walls (e.g., first end wall 612 and second end wall 614) of a housing 610. For example, second shaft 680 may extend from first end wall 612 through the first flange 231 and the second flange 232 of the second guide block 230 to the second end wall 614. In this regard, the first guide block 220 and the second guide block 230 may be fixed in the lateral direction. As such, the cargo restraint assembly 600 may be disposed in areas of cargo deck 18 of FIG. 2 that do not experience a wing down event (e.g., areas of cargo deck 18 that are not aligned with the wings of aircraft 10 from FIG. 1.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A cargo restraint assembly comprising:
a housing having a first end wall, a second end wall, a first base, and a second base, the first end wall extending from the first base to the second base, the second end wall extending from the first base and the second base, the first end wall disposed opposite the second end wall;
a first bracket disposed between the first end wall and the second end wall, the first bracket slidably coupled to the first end wall and the second end wall, the first bracket comprising a first flange and a second flange, the first flange disposed adjacent to the first end wall, the second flange disposed adjacent to the second end wall; and
a first guide block pivotably coupled to the first bracket, the first guide block comprising a lateral retention portion, a vertical retention portion, a first wing portion, and a second wing portion, the lateral retention portion extending from the first flange to the second flange, the vertical retention portion extending from the lateral retention portion in a lateral direction, the first wing portion extending in a longitudinal direction away from the lateral retention portion past the first end wall, and the second wing portion extending in a negative longitudinal direction away from the lateral retention portion past the second end wall.

2. The cargo restraint assembly of claim 1, further comprising a second bracket disposed between the first end wall and the second end wall, the second bracket slidably coupled to the first end wall and the second end wall.

3. The cargo restraint assembly of claim 2, further comprising a second guide block pivotably coupled to the second bracket.

4. The cargo restraint assembly of claim 3, further comprising a spring disposed between the first bracket and the second bracket.

5. The cargo restraint assembly of claim 2, wherein the first bracket and the second bracket each comprise an H-shape.

6. The cargo restraint assembly of claim 1, further comprising a first shaft and a first pin, wherein the first shaft extends from a first slot in the first end wall through the first flange through the second flange and through a second slot in the second end wall, and wherein the first pin extends from the a third slot in the first end wall through the first flange.

7. The cargo restraint assembly of claim 1, further comprising a first shaft extending from the first flange of the first bracket to the second flange of the first bracket, wherein the first guide block is configured to rotate about the first shaft.

8. The cargo restraint assembly of claim 7, further comprising a torsion spring coupled to the first shaft and the first guide block.

9. A cargo loading system, comprising:
a cargo deck;
a first tray extending longitudinally along the cargo deck;
a second tray disposed laterally adjacent to the first tray, the second tray extending longitudinally along the cargo deck;
a cargo restraint assembly disposed between the first tray and the second tray, the cargo restraint assembly coupled to the cargo deck, the cargo restraint assembly comprising:
a housing;
a first bracket slidingly coupled to the housing;
a second bracket slidingly coupled to the housing;
a spring extending between the first bracket and the second bracket;
a first guide block pivotably coupled to the first bracket; and
a second guide block pivotably coupled to the second bracket.

10. The cargo loading system of claim 9, wherein the housing comprises a first end wall, a second end wall, a first base, and a second base, the first end wall extending from the first base to the second base, the second end wall extending from the first base and the second base, the first end wall disposed opposite the second end wall, wherein the first base and the second base are coupled to the cargo deck.

11. The cargo loading system of claim 10, wherein the first end wall and the second end wall comprise a plurality of slots, and wherein the first bracket and the second bracket are slidingly coupled to the plurality of slots.

12. The cargo loading system of claim 11, wherein the cargo restraint assembly further comprises a first shaft, a first pin, and a second pin, wherein the first bracket and the second bracket each comprise a first flange and a second flange, wherein the first flange is disposed adjacent to the first end wall, wherein the second flange disposed adjacent to the second end wall, wherein the first shaft extends from a first slot in the plurality of slots through the first flange and through the second flange into a first slot in the plurality of slots in the second end wall, wherein the first pin extends from a second slot in the first end wall through the first flange, and the second pin extends from the second flange through a second slot in the plurality of slots in the second end wall.

13. The cargo loading system of claim 12, wherein the first guide block and the second guide block each comprise a lateral retention portion, a vertical retention portion, a first wing portion and a second wing portion, the lateral retention portion extending from the first flange to the second flange, the vertical retention portion extending from the lateral retention portion in a lateral direction, the first wing portion extending in a longitudinal direction away from the lateral retention portion past the first end wall, and the second wing portion extending in a negative longitudinal direction away from the lateral retention portion past the second end wall.

14. The cargo loading system of claim 9, wherein the first bracket, the second bracket, the first guide block and the second guide block are configured to laterally attenuate in response to the cargo deck bending.

15. The cargo loading system of claim 9, wherein the first bracket and the second bracket each comprise an H-shape.

16. The cargo loading system of claim 9, further comprising a first shaft extending from a first flange of the first bracket to a second flange of the second bracket, wherein the first guide block is configured to rotate about the first shaft.

17. The cargo loading system of claim 16, further comprising a torsion spring coupled to the first shaft and the first guide block.

18. A method of attenuating a cargo retention assembly, the method comprising:
 translating a first guide block and a second guide block in a lateral direction away from each other via a spring in response to a cargo deck bending; and
 translating the first guide block and the second guide block towards each other in response to the cargo deck no longer bending, wherein the first guide block and the second guide block are slidingly coupled to a housing via a first bracket and a second bracket, and wherein the spring is disposed between the first bracket and the second bracket.

* * * * *